June 25, 1968    R. R. BROWN ETAL    3,390,331
DEVICE FOR DETECTING THE PRESENCE OF VOLTAGE
IN CONNECTORS OF HIGH VOLTAGE SYSTEMS
Filed March 21, 1966    2 Sheets-Sheet 1
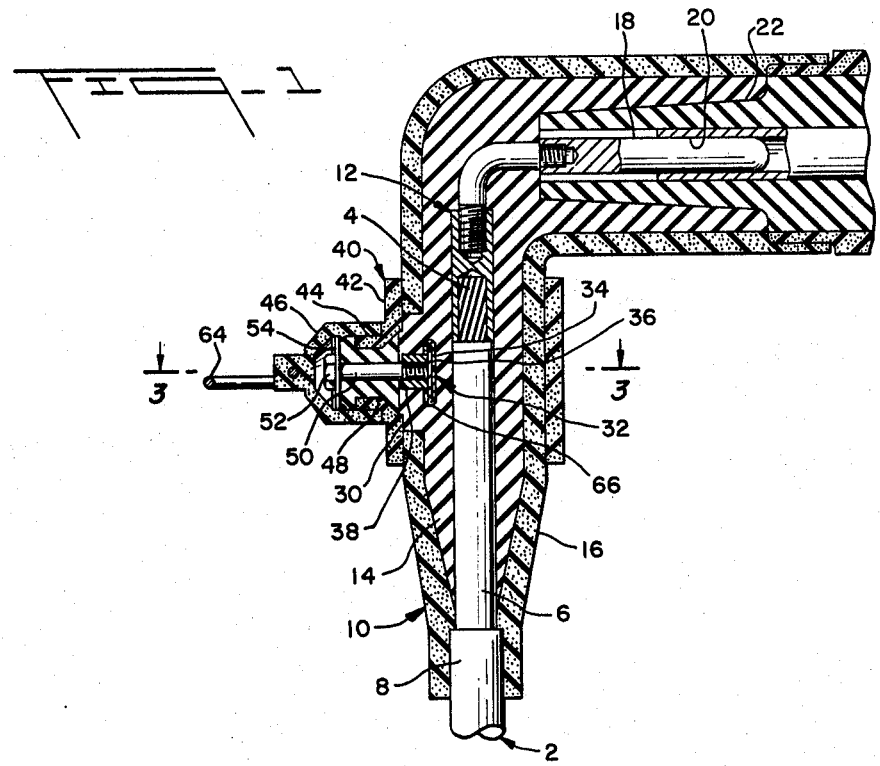
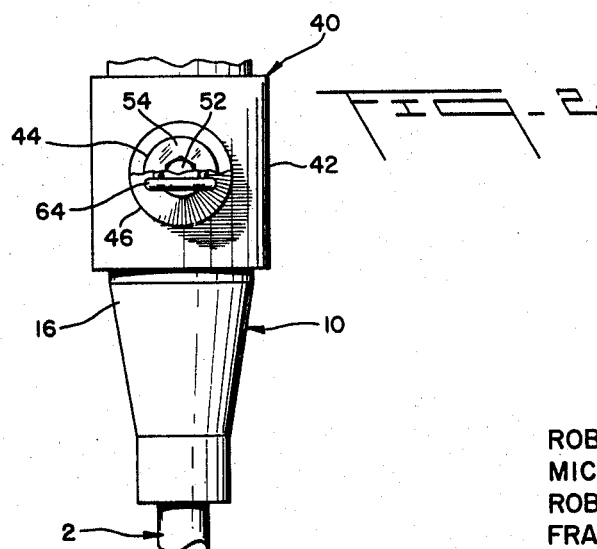
INVENTORS
ROBERT R. BROWN
MICHAEL W. MALIA
ROBERT C. RUETE
FRANK A. SILVA
BY
ATTORNEYS

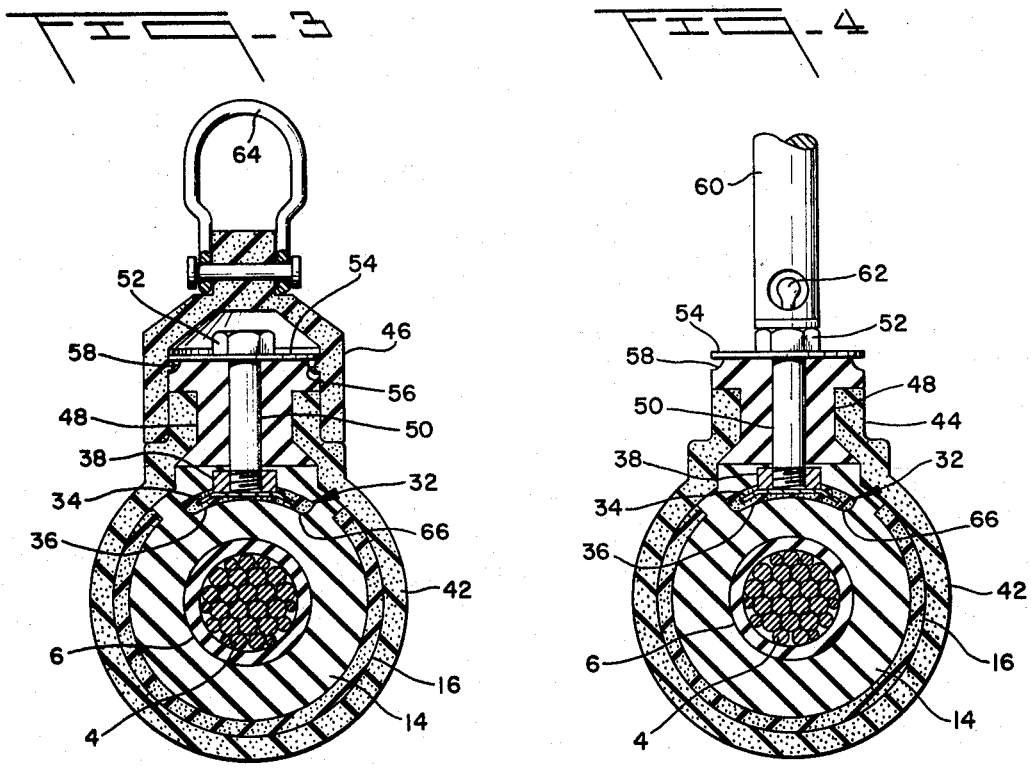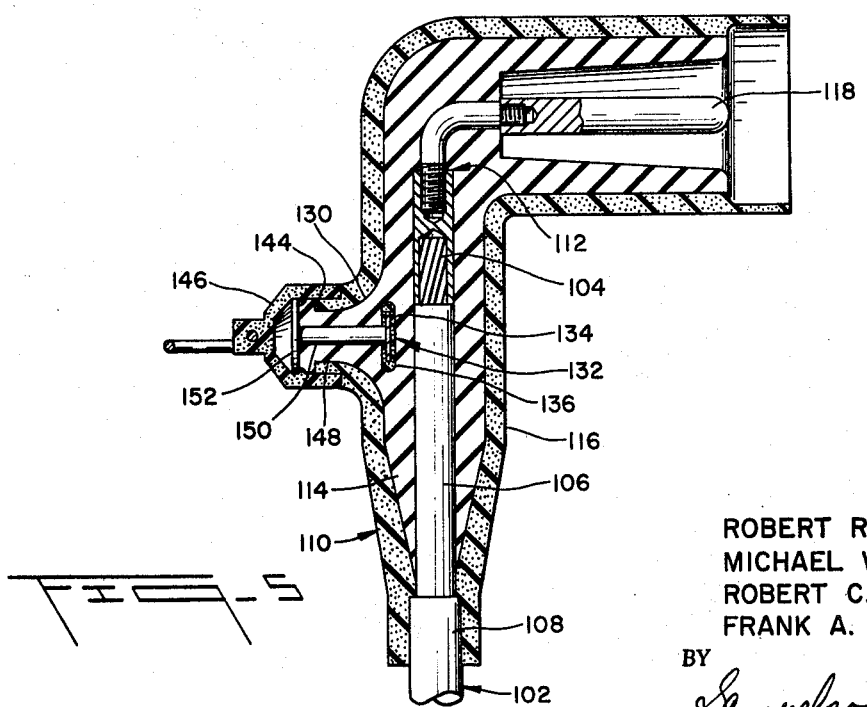

United States Patent Office 3,390,331
Patented June 25, 1968

3,390,331
DEVICE FOR DETECTING THE PRESENCE OF VOLTAGE IN CONNECTORS OF HIGH VOLTAGE SYSTEMS
Robert R. Brown, Bernardsville, Michael W. Malia, Washington, Robert C. Ruete, Long Valley, and Frank A. Silva, Basking Ridge, N.J., assignors to Elastic Stop Nut Corporation of America, Union, N.J., a corporation of New Jersey
Filed Mar. 21, 1966, Ser. No. 535,881
7 Claims. (Cl. 324—122)

ABSTRACT OF THE DISCLOSURE

A device for detecting the presence of voltage in connectors of high voltage systems includes a conductor, an insulator surrounding the conductor, a conductive shield surrounding the insulator, a conductive cap normally covering a break in the shield, and removable to expose the break and the insulator to the outside, an electrode assembly located in the insulator in such proximity to the conductor as to enable the voltage which is to be detected to place an electric charge upon the electrode assembly, and conductive means providing an electrical path between the electrode assembly and the cap when the cap is in position covering the break and providing an electrical path between the electrode assembly and the outside when the cap is removed.

---

The invention relates to a device for detecting the presence of voltage in high voltage systems. In particular, the invention relates to such a device wherein a connector in the system is shielded and must be left connected while utilizing a voltage detection device to detect the presence of such high voltage.

It has been found that a more efficient connection system for high voltage is obtained when the connectors of the system are shielded. Such connectors have been produced by providing a conductive rubber or other elastomer as the outer covering of an insulated high voltage connector. However, since the conductive covering serves as a shield, it is not practical to detect the presence of voltage in the system at the conductor within the connector without disconnecting the connector from the transformer or other connection.

When nonshielded connectors are used, it is standard procedure to place a voltage detection device such as a glow lamp on the outside of the connector. These glow lamps are filled with a gas such as neon which glows in the presence of the electric field resulting from the presence of high voltage. Generally, such lamps are mounted at the end of insulated poles to form devices commonly referred to as glow sticks. Because many high voltage, shielded connectors are located underground and in other relatively inaccessible locations, a system for easily detecting the presence of voltage in the conductor of a relatively inaccessible connector is badly needed.

Broadly, the invention is directed toward providing a construction wherein the conductor in a connector of a high voltage system is normally shielded by an unbroken conductive elastomer covering and wherein the displacement of a portion of the conductive elastomer covering, preferably by the removal of a conductive cap, breaks the shield so as to permit a voltage detection device such as a glow stick to be used to detect the presence of voltage within the connector.

It is an important object of the invention to provide a device for detecting the presence of voltage in a shielded connector of an electrical system without disconnecting the connector.

It is a further object of the invention to provide a shielded connector wherein a conductive cap forming a part of the shield may be removed to permit a voltage detection device such as a glow stick to be placed in proximity to the thus provided unshielded area to detect the presence of voltage in the conductor of the connector.

It is a still further object of the invention to provide a shielded connector wherein a portion of the shield is provided by a sleeve of conductive elastomer fitted tightly over the connector and which has a removable cap of conductive elastomer.

It is a still further object of the invention to provide a shielded connector wherein the conductive elastomer shield is shaped to receive a removable cap of conductive elastomer.

It is a still further object of the invention to provide such shielded connectors including a conductive contact against which a voltage detection device such as a glow lamp may be placed when a conductive elastomer cap is removed in order to utilize the device to detect the presence of voltage in the conductor within the connector.

These and other objects, features, advantages and uses will be apparent during the course of the following description when taken in conjunction with the accompanying drawing, wherein:

FIGURE 1 is a sectional view of an embodiment of shielded connector of the invention wherein a conductive elastomer sleeve surrounds a break in the conductive elastomer shield of the connector and a removable conductive elastomer cap covers the break in the shield;

FIGURE 2 is a plan view of the embodiment of FIGURE 1, partly broken away, showing the removable cap and sleeve on the connector;

FIGURE 3 is a sectional view taken along the lines 3—3 of FIGURE 1, viewed in the direction of the arrows;

FIGURE 4 is a view similar to that of FIGURE 3, with the cap removed and showing a glow stick in contact with the conductive contact; and FIGURE 5 is a view similar to that of FIGURE 1 of a further embodiment of the invention wherein the conductive elastomer shield has a neck surrounding the break in the shield and the removable conductive cap fits on the neck.

In the drawing, wherein, for the purpose of illustration, are shown preferred forms of the device of the invention and wherein like numerals are employed to designate like parts throughout the same, the numeral 10 designates a connector for high voltage systems embodying a form of the device of the invention.

In the embodiment of FIGURES 1 through 4, an electrical cable 2 is shown having a conductor 4, a surrounding sheath of insulating material 6 and an outer shield 8 of conductive material. A connector 10 is seen to comprise a conductor assembly 12, a surrounding insulator 14 of elastomeric material and an outer conductive shield 16 which is preferably formed of a conductive elastomer. Connector 10 is provided with a conductive male pin 18 which is fixed to conductor assembly 12 and cooperatively engages female receptacle 20 which is held in insulator 22. Receptacle 20 may be any type of contact such as for a transformer, distribution panel, jumper or similar connection. Moreover, the teachings of the invention may be carried out anywhere in a high voltage system that is properly equipped therefor.

In order to provide for the detection of voltage within the conductor of the cable and the conductor assembly of the connector, an opening, or break 30 is established in the conductive shield 16 and an electrode assembly 32 is located within the insulator 14 in such proximity with the internal conductors as to enable the voltage which is to be detected to place an electric charge upon the electrode assembly. The electrode assembly 32 is comprised of a metallic plate 34 surrounded by a conductive elastomer 36 and mechanically secured and electrically connected to a threaded block 38, all embedded within the insulating elastomer, preferably by having been molded in place.

A housing assembly 40 is fitted over the conductive shield 16 at the break 30 and includes an outer sleeve 42 of conductive elastomer, the relative dimensions of the sleeve 42 and the shield 16 being such that the housing assembly 40 and shield 16 of connector 10 are secured together mechanically and the sleeve 42 and shield 16 make electrical contact with one another. The tight fit between the housing assembly and the remainder of the connector also serves to eliminate air from between the housing assembly and the break 30. The housing assembly is provided with a neck 44 shaped to receive a cap 46 of conductive elastomer in tight mechanical connection and in electrical contact with the conductive elastomer of the sleeve. Thus, when cap 46 is in a first position in place on neck 44, as seen in FIGURES 1 and 3, the connector 10 is completely shielded since the continuity of the outer shield is not broken. However, upon removal of the cap 46 to a second position, the insulator 14 is open to the outside, as seen in FIGURE 4, by virtue of break 30 and a core 48 of insulating elastomer within the neck 44 which projects from insulator 14 to the outer extremity of the neck. A threaded rod 50 of conductive material engages the electrode assembly 32 and provides an electrical path to head 52 which is integral with rod 50. The head 52 also retains a disk 54 of conductive material in place at the outer extremity of core 48. When the cap 46 is in place upon neck 44, as best seen in FIGURE 3, a bead 56 in the cap is received within a groove 58 established between the core 48 and the disk 54 and any electrical charge placed upon the electrode assembly is drained off along the path provided by rod 50 and disk 54 between the electrode assembly and the outer shield which includes cap 46. When the cap 46 is removed and head 52 of rod 50 is exposed, as best seen in FIGURE 4, any electrical charge on electrode assembly 32 may be detected by bringing a voltage detection device, such as glow stick 60 having neon bulb 62 therein, into contact with head 52.

The cap is readily removed or replaced by utilizing handle 64 attached thereto even though connector 10 may be installed in a location which is not very readily accessible.

It is noted that the electrical charge available to energize the voltage detection device is proportional to the surface area of the electrode assembly and the distance between the internal conductors and the electrode assembly. The placement of the electrode assembly well into the connector aids in attaining sufficient electrical charge to enable effective voltage detection. The rounded configuration along the edge 66 of the electrode assembly also assures more effective operation of the voltage detection system set forth above.

Turning now to the embodiment of FIGURE 5, a cable 102 is shown having a conductor 104, a surrounding sheath of insulating material 106 and an outer shield 108. A connector 110 is similar to connector 10 and comprises a conductor assembly 112, a surrounding insulator 114 of elastomeric material, an outer conductive shield 116 which is preferably formed of a conductive elastomer, and a conductive male pin 118. As in connector 10, connector 110 is provided with an opening or break 130 in conductive shield 116 and an electrode assembly 132 is located within the insulator 114 in such close proximity with the internal conductors so as to enable the voltage which is to be detected to place an electric charge upon the electrode assembly which includes a metallic plate 134 surrounded by a conductive elastomer 136. However, unlike the arrangement in the embodiment of FIGURES 1 through 4, connector 110 is provided with an integrally molded neck 144 shaped to receive a cap 146, both the neck and the cap being of conductive elastomeric material so as to maintain the electrical continuity of the outer shield as long as the cap is in place upon the neck. A core 148 of insulating elastomer is molded integral with the insulator 114 and projects through the neck 144 to establish the desired break in the shield when the cap 146 is removed from the neck. The electrode assembly 132 is provided with an electrically conductive stem 150 having an integral disk-like head 152 and being molded into the connector as part of the electrode assembly. As in the earlier described embodiment, when cap 146 is in place upon neck 144, any electrical charge placed upon the electrode assembly, is drained off through head 152 to the outer shield which includes cap 146. When the cap is removed, any electrical charge on the electrode assembly may be detected by placing a voltage detection device against head 152 and the presence of voltage at the internal conductors can be determined.

It will be apparent that the invention is not to be limited to the embodiments set forth in the drawing and description, and that variations may be made in form and construction without departing from the spirit and scope of the invention as defined in the appended claims.

What is claimed is:

1. A device for use with a voltage indicating apparatus for detecting the presence of voltage in connectors of high voltage systems comprising:
   a conductor;
   an insulator surrounding the conductor;
   a conductive shield surrounding the insulator;
   a displaceable conductive portion in the conductive shield movable between a first position and a second position such that the insulator is covered by the conductive shield when the portion is in the first position and a break is established in the conductive shield such that the insulator is open to the outside at the break when the portion is in the second position;
   an electrode assembly located in the insulator and being in such proximity to the conductor as to enable the voltage which is to be detected to place an electric charge upon the electrode assembly; and
   conductive means providing an electrical path between the electrode assembly and the displaceable conductive portion when the conductive portion is in the first position and providing an electrical path between the electrode assembly and the voltage indicating apparatus when the conductive portion is in the second position.

2. A device for detecting the presence of voltage in connectors of high voltage systems as described in claim 1 including:
   a sleeve of conductive material surrounding the conductive shield at the break;
   a neck of conductive material in the sleeve and overlying the break; and
   the displaceable conductive portion comprising a removable cap of conductive material fitted to the neck and in electrical contact therewith and with the conductive means when the cap is in the first position, and removed therefrom and from electrical contact with the conductive means when the cap is in the second position.

3. A device for detecting the presence of voltage in connectors of high voltage systems as described in claim 1 wherein a neck of conductive material is integrally molded in the conductive shield surrounding the break and the displaceable conductive portion includes a removable cap of conductive material fitted to the neck and in electrical contact therewith and with the conductive means when the cap is in the first position, and removed therefrom and from electrical contact with the conductive means when the cap is in the second position.

4. A device for detecting the presence of voltage in connectors of high voltage systems as described in claim 2 wherein the electrode assembly includes a metallic plate embedded in a conductive elastomer located in the insulator adjacent the conductor.

5. A device for detecting the presence of voltage in connectors of high voltage systems as described in claim 2 wherein the conductive shield, the sleeve and the removable cap are formed of conductive elastomer.

6. A device for detecting the presence of voltage in connectors of high voltage systems as described in claim 3 wherein the electrode assembly includes a metallic plate embedded in a conductive elastomer located in the insulator adjacent the conductor.

7. A device for detecting the presence of voltage in connectors of high voltage systems as described in claim 3 wherein the conductive shield and the removable cap are formed of conductive elastomer.

References Cited

UNITED STATES PATENTS

| | | | |
|---|---|---|---|
| Re. 18,189 | 9/1931 | Austin | 174—143 XR |
| 1,750,326 | 3/1930 | Nyman | 324—95 XR |
| 1,902,617 | 3/1933 | Burr | 174—143 XR |
| 2,937,359 | 5/1960 | Cronin et al. | 174—152 XR |
| 3,243,756 | 3/1966 | Ruete et al. | 174—73 XR |
| 3,328,690 | 6/1967 | Lockie et al. | 324—122 |
| 3,343,153 | 9/1967 | Waehner | 324—133 XR |

RUDOLPH V. ROLINEC, *Primary Examiner.*

E. F. KARLSEN, *Assistant Examiner.*